US012166837B1

(12) United States Patent
Levert et al.

(10) Patent No.: US 12,166,837 B1
(45) Date of Patent: Dec. 10, 2024

(54) APPLICATION PROGRAMMING INTERFACE PROXY WITH BEHAVIOR SIMULATION

(71) Applicant: Microsoft Technology Licensing, LLC, Redmond, WA (US)

(72) Inventors: Sébastien Levert, Montreal (CA); Waldemar Mastykarz, Alphen aan den Rijn (NL); Garry James Trinder, Goole (GB); Gavin Douglas Barron, Bothell, WA (US)

(73) Assignee: Microsoft Technology Licensing, LLC., Redmond, WA (US)

( * ) Notice: Subject to any disclaimer, the term of this patent is extended or adjusted under 35 U.S.C. 154(b) by 0 days.

(21) Appl. No.: 18/488,922

(22) Filed: Oct. 17, 2023

(51) Int. Cl.
    *G06F 9/54* (2006.01)
    *H04L 67/56* (2022.01)

(52) U.S. Cl.
    CPC .............. *H04L 67/56* (2022.05); *G06F 9/541* (2013.01); *G06F 9/547* (2013.01)

(58) Field of Classification Search
    CPC ........... H04L 67/56; G06F 9/541; G06F 9/547
    See application file for complete search history.

(56) References Cited

U.S. PATENT DOCUMENTS

| | | | | |
|---|---|---|---|---|
| 10,705,942 B1* | 7/2020 | Jha | ...................... | G06F 11/3684 |
| 10,810,055 B1* | 10/2020 | Walker | ................ | G06F 16/2358 |
| 2008/0209451 A1* | 8/2008 | Michels | ................. | G06F 15/16 |
| | | | | 719/328 |
| 2012/0180021 A1* | 7/2012 | Byrd | ....................... | G06F 21/45 |
| | | | | 717/100 |
| 2013/0074046 A1* | 3/2013 | Sharma | ............... | G06F 11/3692 |
| | | | | 717/126 |
| 2016/0024893 A1* | 1/2016 | Al-Zawawi | ............. | G06F 30/20 |
| | | | | 703/10 |
| 2017/0371937 A1* | 12/2017 | Shah | ........................ | G06F 8/71 |
| 2018/0357154 A1* | 12/2018 | Dolby | ................. | G06F 11/3664 |
| 2020/0142818 A1* | 5/2020 | Holla | .................. | G06F 11/3688 |
| 2020/0242020 A1* | 7/2020 | Bates | .................... | H04L 67/146 |

(Continued)

OTHER PUBLICATIONS

Mastykarz, et al., "Microsoft 365 Developer Proxy", https://github.com/microsoft/m365-developer-proxy, Sep. 3, 2023, 4 Pages.

*Primary Examiner* — Chris Parry
*Assistant Examiner* — Hassan A Khan
(74) *Attorney, Agent, or Firm* — Barta Jones, PLLC

(57) ABSTRACT

An application programming interface (API) proxy intercepts API calls and responses for an application under test in a development environment, simulating (e.g., mocking) rate limiting and throttling behavior, which is otherwise challenging to test. The API proxy receives a API call and, based on a resource limiting parameter (e.g., rate-limiting or otherwise throttling), determines that the API call should be forwarded to the API endpoint. When the API proxy receives another API call from the application, destined for the same API endpoint, the API proxy determines to not forward the second API call, based on the resource limiting parameter (e.g., too soon after the first API call, or requests too much of a computational burden, such as exceeding a resource quota). The API proxy instead returns a throttling response, as would be expected from the API endpoint. The API proxy provides guidance messages for both outgoing calls and incoming responses.

20 Claims, 14 Drawing Sheets

(56) References Cited

U.S. PATENT DOCUMENTS

| | | | |
|---|---|---|---|
| 2020/0348986 A1* | 11/2020 | Venkatesh | G06F 8/36 |
| 2020/0409780 A1* | 12/2020 | Balasubramanian | ......... G06F 9/3838 |
| 2022/0405119 A1* | 12/2022 | Ortiz | G06F 9/485 |
| 2024/0070448 A1* | 2/2024 | Sagar | G06F 9/54 |
| 2024/0095127 A1* | 3/2024 | Kumar | G06F 9/547 |
| 2024/0155024 A1* | 5/2024 | Palladino | G06F 8/73 |

* cited by examiner

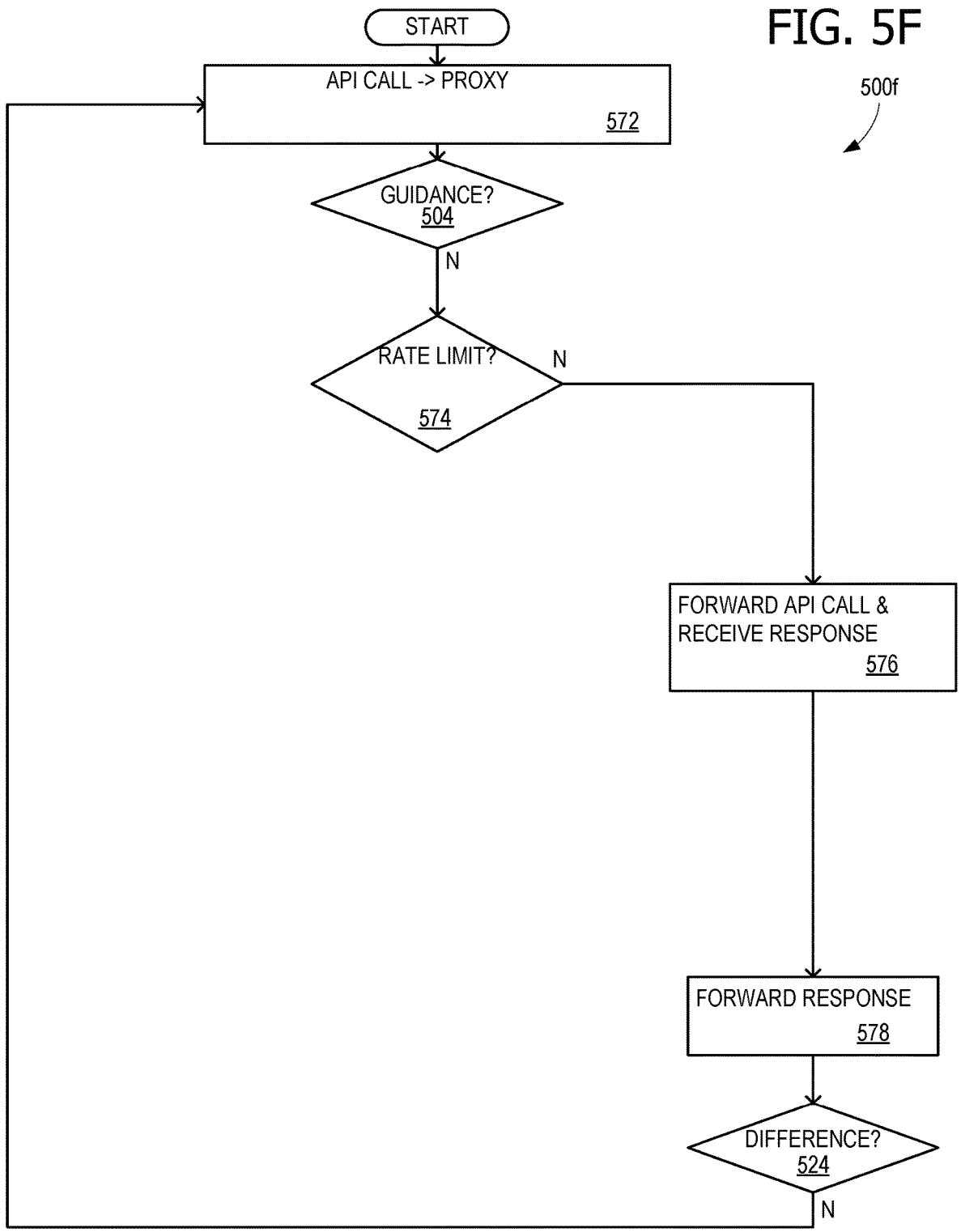

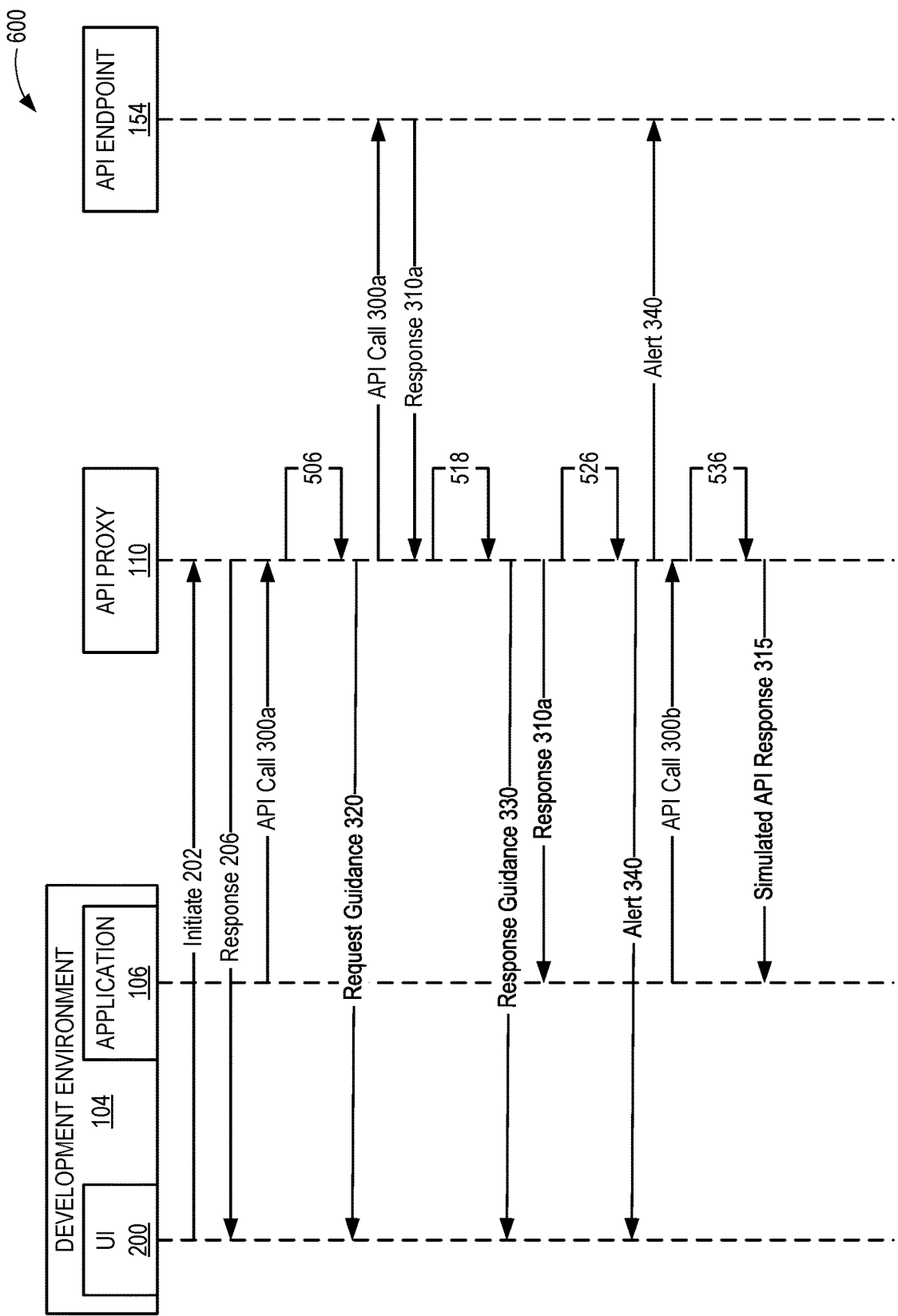

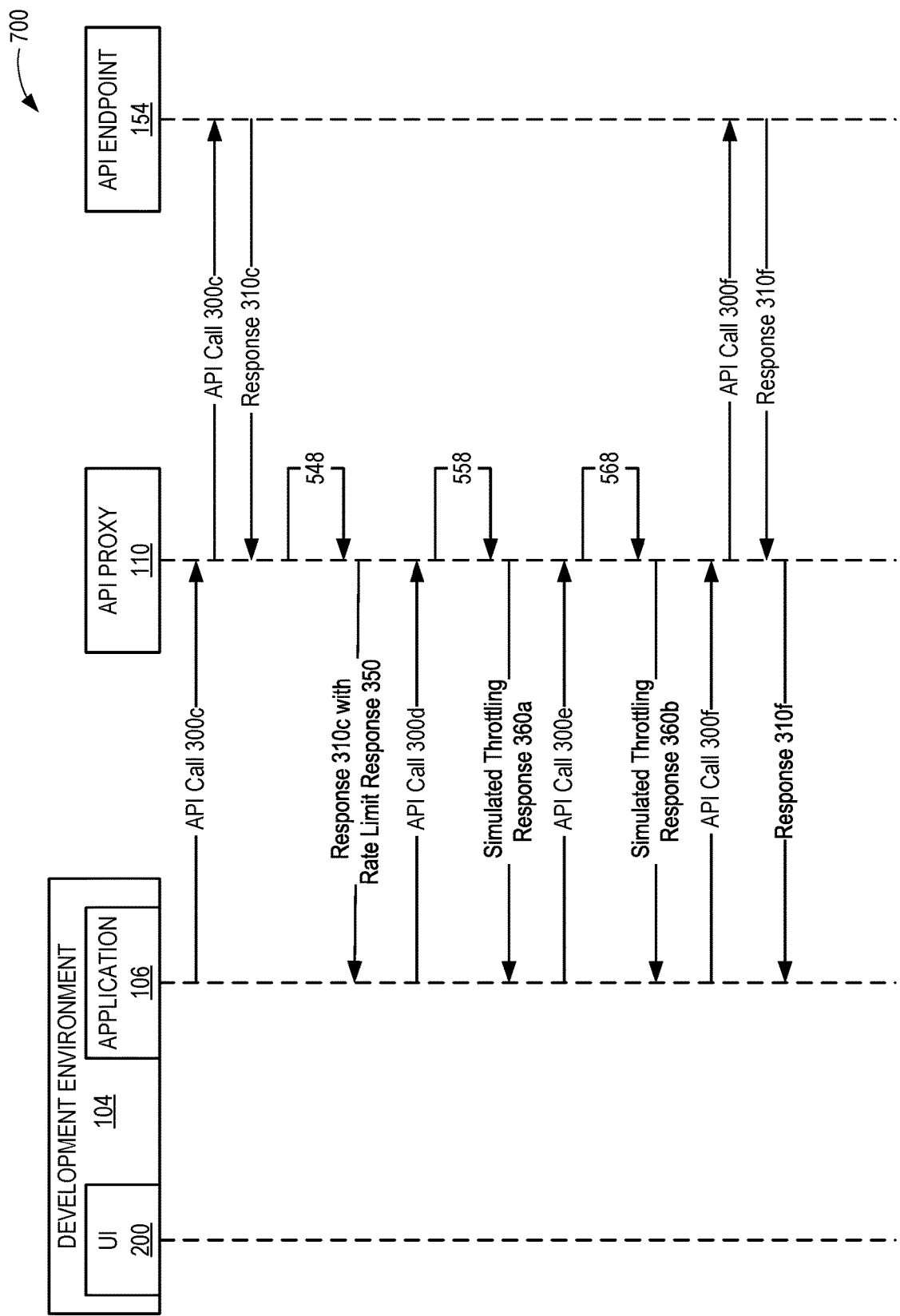

APPLICATION PROGRAMMING INTERFACE PROXY WITH BEHAVIOR SIMULATION

BACKGROUND

A computer software application may communicate with another application using an application programming interface (API). An API call is a request sent by one application to an API asking another application to respond with information and/or perform an action.

When developing an application, the developer needs to test whether the application generates API calls correctly and responds to API call responses correctly. However, in a common scenario when the API, to which the application directs the API calls, is not within the control of the developer, testing options are limited. For example, there may be costs and usage limitations associated with the API, and the developer will likely wish to avoid using up resource allocations on testing. Further, some tests may require forcing error or overload conditions on the API, which the API owner will view as problematic activity. Unfortunately, these and other issues may limit testing scope and thus degrade the effectiveness of the testing.

SUMMARY

The disclosed examples are described in detail below with reference to the accompanying drawing figures listed below. The following summary is provided to illustrate some examples disclosed herein.

An application programming interface API proxy that is capable of behavior simulation (mocking) is disclosed. Examples receive, by an application programming interface (API) proxy, a first API call from an application executing in a development environment, wherein the first API call comprises an API endpoint: based on at least a resource limiting parameter, forward the first API call to the API endpoint: receive a second API call from the application, wherein the second API call comprises the API endpoint; based on at least (i) the resource limiting parameter and (ii) timing or computational burden of the second API call, determine to not forward the second API call to the API endpoint; and based on at least not forwarding the second API call to the API endpoint, transmit, by the API proxy, to the application, a first simulated throttling response.

BRIEF DESCRIPTION OF THE DRAWINGS

The disclosed examples are described in detail below with reference to the accompanying drawing figures listed below:

FIGS. 5A, 5B, 5C, 5D, 5E, and 5F show specific subsets of the operations of the flowchart of FIG. 5 that are visited during specific passes that are described through the flowchart of FIG. 5:

FIGS. 6 and 7 show message sequence diagrams of messages that may occur when using example architectures, such as that of FIG. 1;

Corresponding reference characters indicate corresponding parts throughout the drawings. Any of the drawings may be combined into a single example or embodiment.

DETAILED DESCRIPTION

Figure 1:
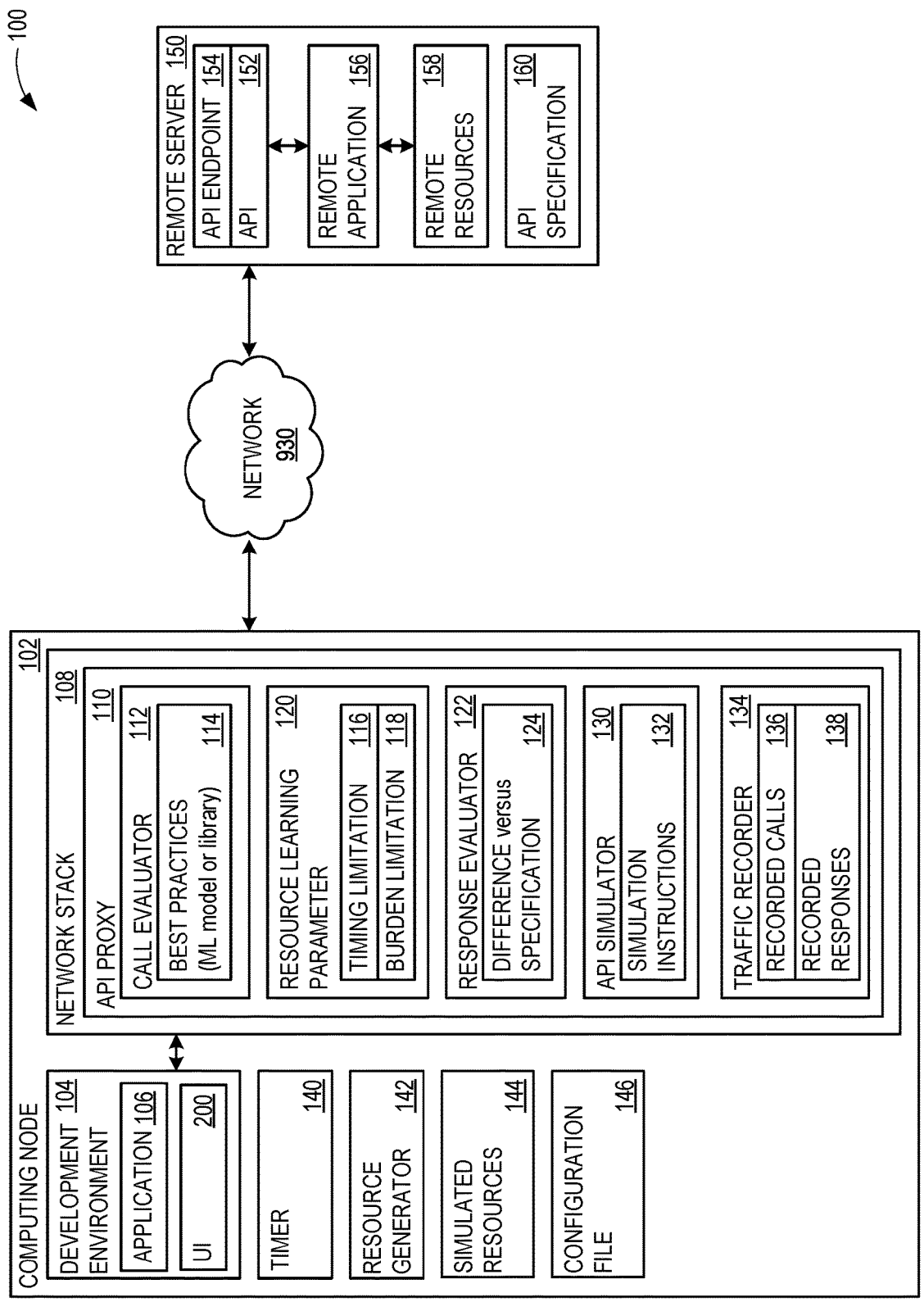
FIG. 1 illustrates an example architecture that advantageously provides an API proxy that is capable of behavior simulation.

An application programming interface (API) proxy with behavior simulation not only provides API responses, but also simulates (e.g., mocks) rate limiting and throttling behavior. In an example, the API proxy registers with the network stack to intercept API calls and responses for an application under test in a development environment. The API proxy receives (e.g., intercepts) a first API call from the application, and based on a resource limiting parameter (e.g., rate-limiting or otherwise throttling), determines that the first API call should be forwarded to an API endpoint. In some examples, an API endpoint is a network address (e.g., a web address) that represents a specific resource or service provided by the API.

When the API proxy receives a second API call from the application, destined for the same API endpoint, the API proxy determines to not forward the second API call, based on the resource limiting parameter. For example, the second API call is too soon after the first API call, and/or requests too much of a computational burden such as exceeding a resource quota). The API proxy instead returns a simulated throttling response, as would be expected from the API endpoint if the API endpoint had indeed been triggered to throttle the application. However, this is advantageously accomplished without needing to actually trigger a throttling response from the API endpoint.

Other API behavior may also be simulated, such as for example using simulated resources to generate API responses. Some examples of the API proxy evaluate API calls to determine whether best practices are being followed, such as using the correct privilege level for a request, not requesting too many or too few resources, omitting items that should be requested, using beta APIs, and other practices, and provide guidance for the developer. Some examples of the API proxy evaluate API responses and provide guidance, based on accumulated knowledge within the API proxy regarding what is observed within the response. Machine learning (ML) and/or other artificial intelligence (AI) tools, may determine the guidance for calls and responses.

Aspects of the disclosure reduce the amount of computing resources used by software developers by offloading resource-intensive testing of APIs from operational APIs to an API proxy that is capable of behavior simulation, for example testing of throttling conditions and other rate-limiting triggers (e.g., exceeding resource quotas). Not only does this novel approach reduce network traffic (e.g., by intercepting API calls before they leave the developer's computer, in some examples), but also reduces the burden on the operational APIs that are serving other users, by insulating the APIs from stress testing large numbers of calls or large amounts of requested data. This reduces the level of computing resources needed to serve other users, and is accomplished, at least in part by, determining to not forward the API call to an API endpoint. In some examples, the decision to not forward the API call is made based on at least (i) a resource limiting parameter and (ii) timing or computational burden of the API call.

Aspects of the disclosure also improve the reliability of computing resources by permitting developers to perform test cases (e.g., for applications under development) that may otherwise be unavailable. This permits developers to identify opportunities to improve the applications prior to release to users. This improves efficiency as well as usability of the applications. The applications will then execute more reliably than if the developer had not been able to perform the test cases and remedy any problems identified in the test cases. Example test cases include stressing an API beyond its capacity, which may be prohibitively expensive for the developer or forbidden by the API owner in existing systems. Aspects of the disclosure include an API proxy that determines whether an API call complies with a simulated throttling response (e.g., to a prior API call). Thus, aspects of the disclosure solve a problem unique to the domain of computing.

The various examples are described in detail with reference to the accompanying drawings. Wherever preferable, the same reference numbers are used throughout the drawings to refer to the same or like parts. References made throughout this disclosure relating to specific examples and implementations are provided solely for illustrative purposes but, unless indicated to the contrary, are not meant to limit all examples.

FIG. 1 illustrates an example architecture 100 that advantageously provides an API proxy 110 that is capable of behavior simulation, for example, simulating the behavior of an API 152 executing on a remote server 150, located across a network 930 from a computing node 102 that is hosting a development environment 104 where an application 106 is being developed. When application 106 is released to users, it will use API 152 to request a remote application 156 to retrieve data from remote resources 158, such as to request weather information, e-commerce activity information, or other information. Remote resources 158 may be weather forecasts for different locations (e.g., different cities), purchase order information, customer records, or other data sources that are mined by remote application 156 for specific information, at the request of application 106 via API 152.

Different API owners may implement their APIs differently, resulting in different behaviors and error responses. For example, different APIs may behave differently in response to a large number of applications attempting simultaneous access, or different applications requesting large amounts of information within a single API call, which places a high computational burden on the servers hosting the applications and/or the applications being tasked via the APIs. This complicates application development, because a developer cannot optimize an application for one API and then replicate that same implementation for other APIs, expecting the same level of optimization.

Some API owners publish a specification that details the intended behavior of the API, which developers can use as a development target. For example, server 150 holds an API specification 160 that details the intended behavior of API 152, and also remote application 156 and any API gateway in some examples. The developer of application 106 may use API specification 160 as a guide when developing application 106. However, there may be errors in API specification 160 and/or the implementation of API 152 that result in unexpected behavior that may only be discovered through testing application 106.

API proxy 110 intercepts and analyzes API calls (e.g., API call 300, shown in FIG. 3) sent by application 106 to API 152, to determine that the API calls are using the best practices for using API 152. API proxy 110 also intercepts and analyzes API responses (e.g., response 310, also shown in FIG. 3) returned to application 106 from API 152. Based on the analyses, API proxy 110 may provide the developer with tailored guidance on how to improve application 106, specifically how to improve the quality and performance of API calls of application 106. When application 106 places API calls to multiple different APIs, the various contextual guidance messages provided by the disclosure may each be tailored to specific API differently.

API proxy 110 also simulates elusive and dynamic behaviors of cloud APIs, such as throttling and rate-limiting behavior that occurs when application 106 exceeds its resource quota for a time period, and also when a large number of other applications attempt to access API 152 simultaneously and end up overwhelming API 152 (or remote application 156). This permits testing application 106 "at scale" (e.g., simulating a large number of deployed applications all accessing API 152 simultaneously) which may be an otherwise elusive or prohibitively expensive test case to perform with existing systems. This allows developers to experience how their application will react to cloud API errors without having to forcefully break the API. The benefit for the developer is that application 106 may be deployed with confidence that it will properly handle API behaviors and errors that may otherwise not be tested.

Computing node 102 has a development environment 104 and a network stack 108, and may be an example of a computing device 900 (described later, in relation to FIG. 9). Development environment 104 is used for development and testing of application 106, and interfaces with API proxy 110 via a user interface (UI) 200, which is shown in further detail in FIG. 2. API proxy 110 registers into network stack 108 of computing node 102 to intercept API calls sent by application 106 to API 152 using an API endpoint 154.

By registering into network stack 108, API proxy 110 is agnostic to the programming language and other application specifics, rendering it applicable to a wide variety of testing applications. In some examples, API endpoint 154 comprises a uniform resource identifier (URI) identifying API 152 at remote server 150. In some examples, the URI comprises a uniform resource locater (URL).

API proxy 110 has an API call evaluator 112 that evaluates intercepted API calls to determine: (1) whether to forward an API call to API 152 or instead return a simulated response; and (2) whether to return any guidance regarding the API call (e.g., request guidance), and if so, what request guidance to return. In some examples, API call evaluator 112 comprises a trained ML model. In some examples, API call evaluator 112 uses pattern analysis of API calls, such as whether application 106 is using instructions provided in responses to prior API calls, or whether application 106 is instead ignoring the prior instructions and is instead guessing when formulating API calls.

In some examples, API call evaluator 112 has an API call best practices model 114, which may include an ML model and/or a library of best practices. In some examples, the library is implemented, at least partially, in the form of plug-ins of topic-specific modules. The plug-in modules may be generic or specific to certain APIs. For example, a security-related module may address issues such as whether an API call is using the proper privilege level, and provide guidance if the privilege level is too low (e.g., data will not be retrieved) or too high (e.g., which is a security risk). Guidance informing the developer that privilege is too high may include a warning that, if the application is breached, it can be used for further malicious exploits.

Other best practice modules may provide guidance on the computational burden placed on the API, such as suggesting that data requested within a single API call should instead be split into multiple requests spanning multiple API calls, or suggesting that multiple API calls should be combined. Some modules may check for gaps in requested data (e.g., data with indices 1-5 are requested, then with indices 7-11, skipping index 6). Other best practice modules may include topics such as proxy settings, supported HTTP error status codes, caching guidance, beta support, data paging, rate limiting, and retry guidance.

In some examples, API proxy 110 uses a resource limiting parameter 120 used to compare the frequency and/or expected computational burdens of API calls. Resource limiting parameter 120 may include an API call timing limitation 116 that limits how many API calls application 106 may make to API 152 within a predefined time period, add/or a computational burden limitation 118. When API proxy 110 detects that API calls from application 106 exceed resource limiting parameter 120 (e.g., too many or too large requests), API proxy 110 may avoid forwarding the API call to API 152 and send a simulated response to application 106, instructing application 106 to delay transmitting any more API calls to API 152 for some time period. API proxy 110 may use a timer 140 to determine whether application 106 is transmitting API calls too rapidly.

API proxy 110 has a response evaluator 122 that evaluates intercepted API responses (e.g., response 310 of FIG. 3) to determine whether to return any guidance regarding the response (e.g., response guidance), and if so, what request guidance to return. In some examples, response evaluator 122 comprises a trained ML model. In some examples, response evaluator 122 leverages best practices model 114 and its library of topic-specific modules. In some examples, response evaluator 122 identifies when responses from API 152 do not match API specification 160, and determines a difference 124 between API specification 160 and actual behavior of API 152.

An alert 340 (shown in FIG. 3) containing difference 124 may be sent to development environment 104, to inform the developer of application 106, and/or sent to remote server 150 to inform the owner of API 152, so that API 152 or API specification 160 can be corrected. In such examples, API specification 160 needs to be provided to response evaluator 122 in an electronic format during configuration of API proxy 110.

An API simulator 130 permits API proxy 110 to properly simulate the specific behavior of API 152. In some examples, API simulator 130 comprises an ML model, which may be both initially trained, and have ongoing training as an API traffic recorder 134 records API calls sent to API 152 and responses received from API 152. In some examples, API simulation instructions 132 (e.g., error and warning responses) are uploaded by the tester of application 106, if API simulator 130 does not already have them. API traffic recorder 134 is shown with recorded API calls 136 and recorded responses 138 that are used to build and improve the capability of API simulator 130. An example usage scenario for API simulator 130 is to program it to provide a simulated response to application 106 every $N^{th}$ API call, in accordance with API simulation instructions 132, instead of forwarding the API call to API 152.

Figure 2:
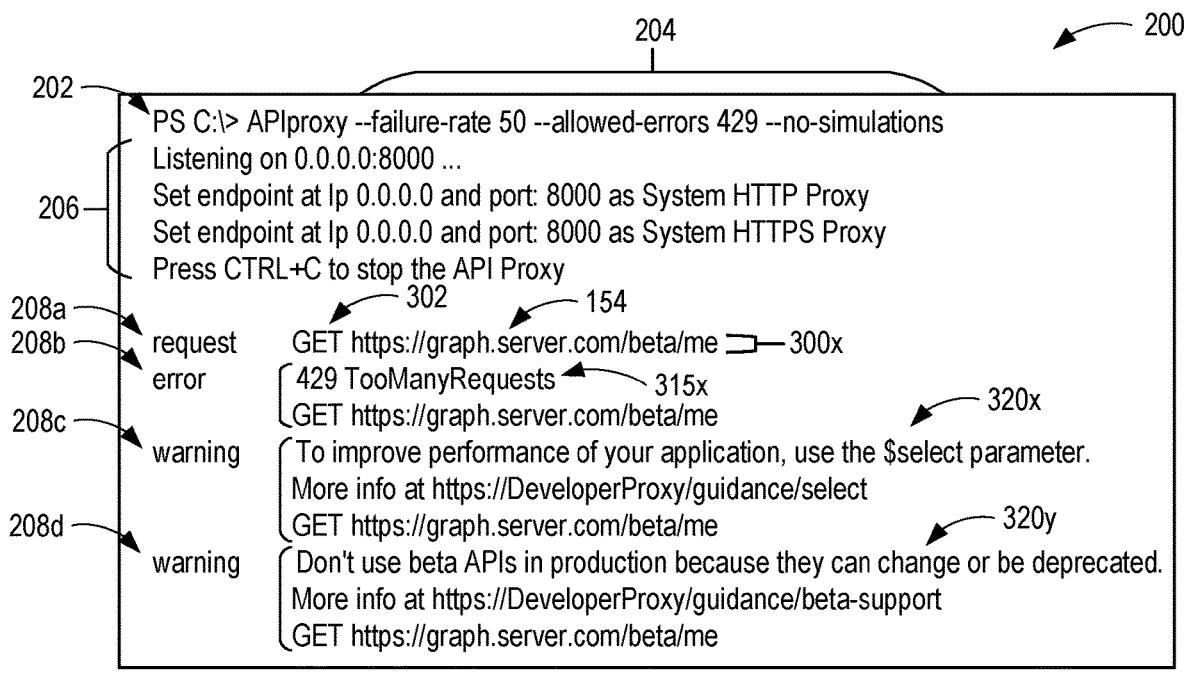
FIG. 2 illustrates an exemplary user interface (UI) that may be employed in example architectures, such as that of FIG. 1.

Some examples of API proxy 110 are programmable via command line arguments, such as command line arguments 204 (shown in FIG. 2). In addition or instead, some examples of API proxy 110 use a configuration file 146 to provide instructions or control inputs. Some examples of API proxy 110 are able to simulate API gateway devices, which are typically placed between network 930 and the API endpoint (e.g., API endpoint 154) to prevent certain traffic from reaching API 152. In such examples, the API gateway simulation capability may be placed within API proxy 110 itself, or in a companion function.

Another value-add tool is a simulated resource generator 142 that generates simulated resources 144, which may be used by API simulator 130. For example, simulated resource generator 142 generates simulated weather reports, purchase order information, customer records, or other data sources. This enables API simulator 130 to simulate remote application 156 mining remote resources 158 for specific information, without actually using remote resources 158. This reduces burdens on remote server, as well as provides benefits for privacy considerations, for some types of data. Simulated resource generator 142 may comprise an ML model and be separate from or included within API proxy 110.

FIG. 2 illustrates further detail for UI 200. In some examples, UI 200 comprises a shell command prompt tool. An initial instruction 202 activates API proxy 110, and provides instructions using command line arguments 204. A response 206 from API proxy 110 identifies port information and provides user instructions on how to halt execution of API proxy 110 (e.g., "Press CTRL+C").

A tag 208a identifies an API call 300x, which is an example of API call 300 shown in further detail in FIG. 3, below. API call 300x has an API method 302 ("GET") and an API endpoint 154. A tag 208b identifies an error and a simulated API response 315x ("429 Too Many Requests"). This is an example of API proxy 110 determining that computational burden limitation 118 has been exceeded, and simulated API response 315x is provided without actually having to burden API 152 with the error condition. Simulated API response 315x is an example of simulated API response 315 shown in FIG. 3, below.

Additional request guidance messages are also provided. In some examples, API proxy 110 provides multiple guidance messages for API calls and responses, when more than one type of guidance is warranted. In the example of FIG. 2, a warning tag 208c is associated with an associated request guidance 320x ("To improve performance of your application, use the $select parameter: More info at https://DeveloperProxy/guidance/select"), and a warning tag 208d is associated with an associated request guidance 320y ("Don't use beta APIs in production because they can change or be deprecated: More info at https://DeveloperProxy/guidance/beta-support"). Request guidance 320x and 320y are examples of request guidance 320 shown in FIG. 3 below.

Figure 3:
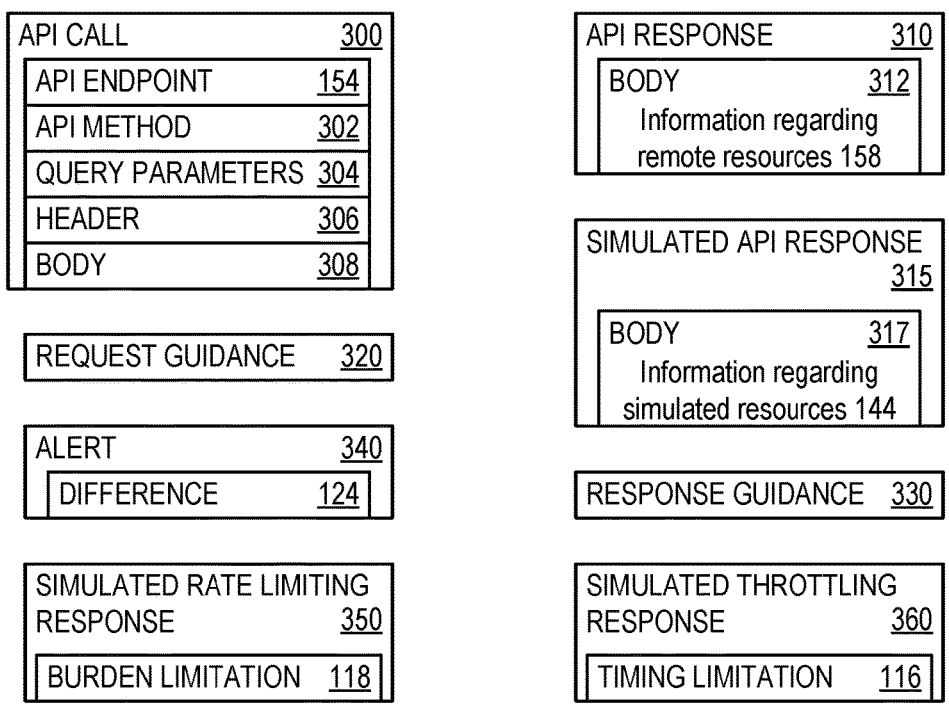
FIG. 3 illustrates exemplary messages that may be used in example architectures, such as that of FIG. 1.

FIG. 3 illustrates exemplary messages that may be used in examples of architecture 100. Application 106 sends API call 300 that comprises API endpoint 154, API method 302, one or more query parameters 304, a header 306, and a body 308. In some examples, API method 302 may be any of GET, POST, PUT or PATCH, and DELETE. Examples of query parameters 304 include cities and dates for weather requests. In some examples, API call 300 uses the JavaScript Object Notation (JSON) format.

API 152 sends response 310, which has a body 312 that contains information on remote resources 158. API simulator 130 sends simulated API response 315, which has a body 317 that contains information on simulated resources 144. API proxy 110 sends out request guidance message 320 and response guidance message 330 that inform the developer how to improve application 106. In some examples, API proxy 110 also sends out an alert 340 to the developer and/or remote server 150 to inform one or both about difference 124 between API specification 160 and actual behavior of API 152. When warranted, API proxy 110 sends out a simulated rate limiting response 350 that includes computational burden limitation 118, and a simulated throttling response 360 that includes API call timing limitation 116.

Figure 4:
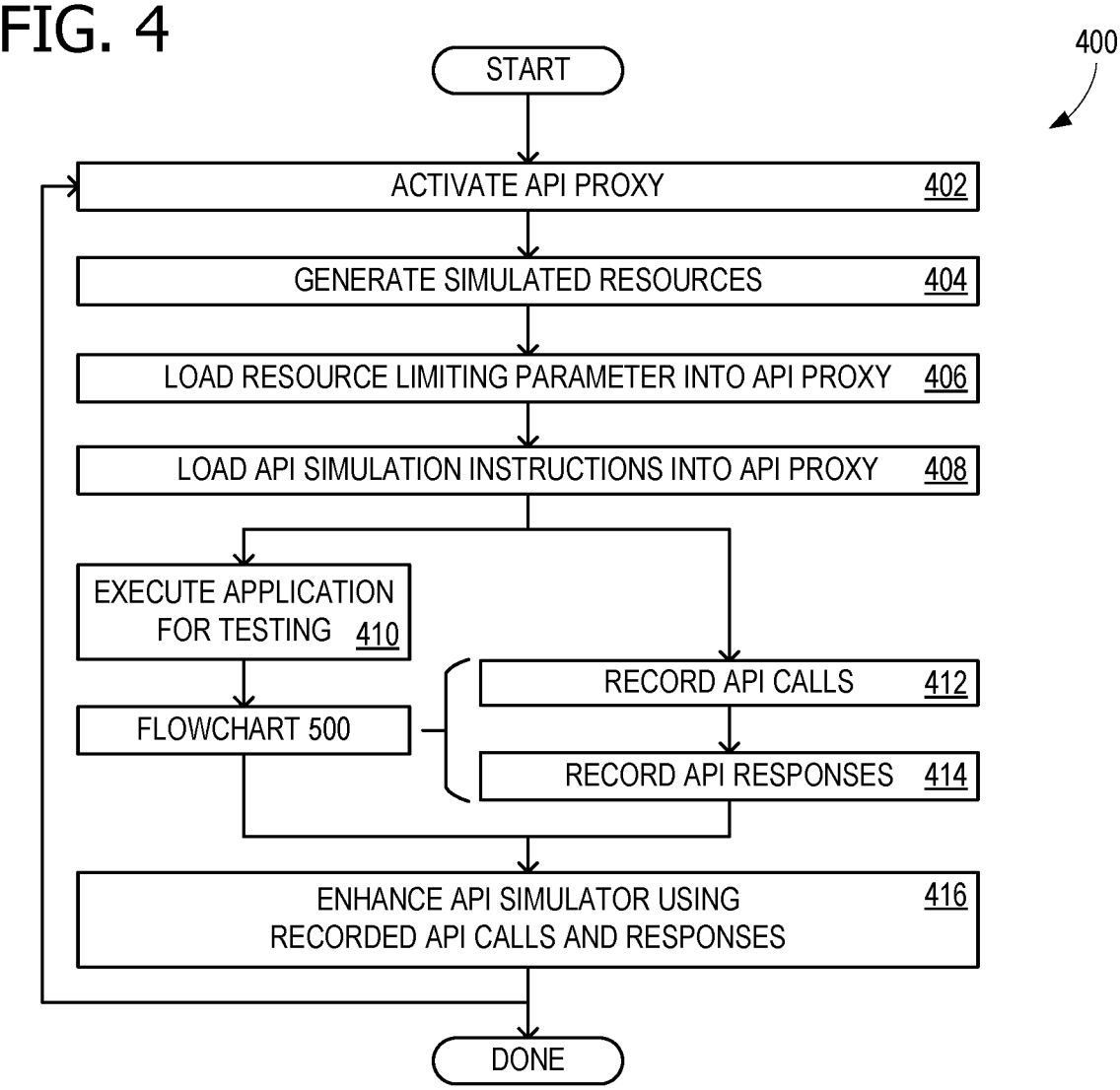
FIGS. 4 and 5 show flowcharts illustrating exemplary operations that may be performed when using example architectures, such as that of FIG. 1.

FIG. 4 shows a flowchart 400 illustrating exemplary operations that may be performed by architecture 100. In some examples, operations described for flowchart 400 are performed by computing device 900 of FIG. 9. Flowchart 400 commences with development environment 104 (e.g., UI 200 within development environment 104) activating API proxy 110 in operation 402. This is shown in FIG. 2 and also in FIG. 6 as initial instruction 202 and response 206. In some examples, API proxy 110 and development environment 104 are both hosted by computing node 102, and in some examples, API proxy 110 registers with network stack 108 of computing node 102.

Simulated resource generator 142 generates simulated resources 144 in operation 404. The tester of application 106 (e.g., the developer) instructs API proxy 110 from development environment 104 with resource limiting parameter 120 or the resource limiting parameter 120 may be received from a configuration file 146. API proxy loads resource limiting parameter 120 in operation 406. Resource limiting parameter 120 may include API call timing limitation 116 (e.g., a delay instruction for delaying future API calls) and/or computational burden limitation 118. API proxy 110 loads API simulation instructions 132 in operation 408.

Figure 5:
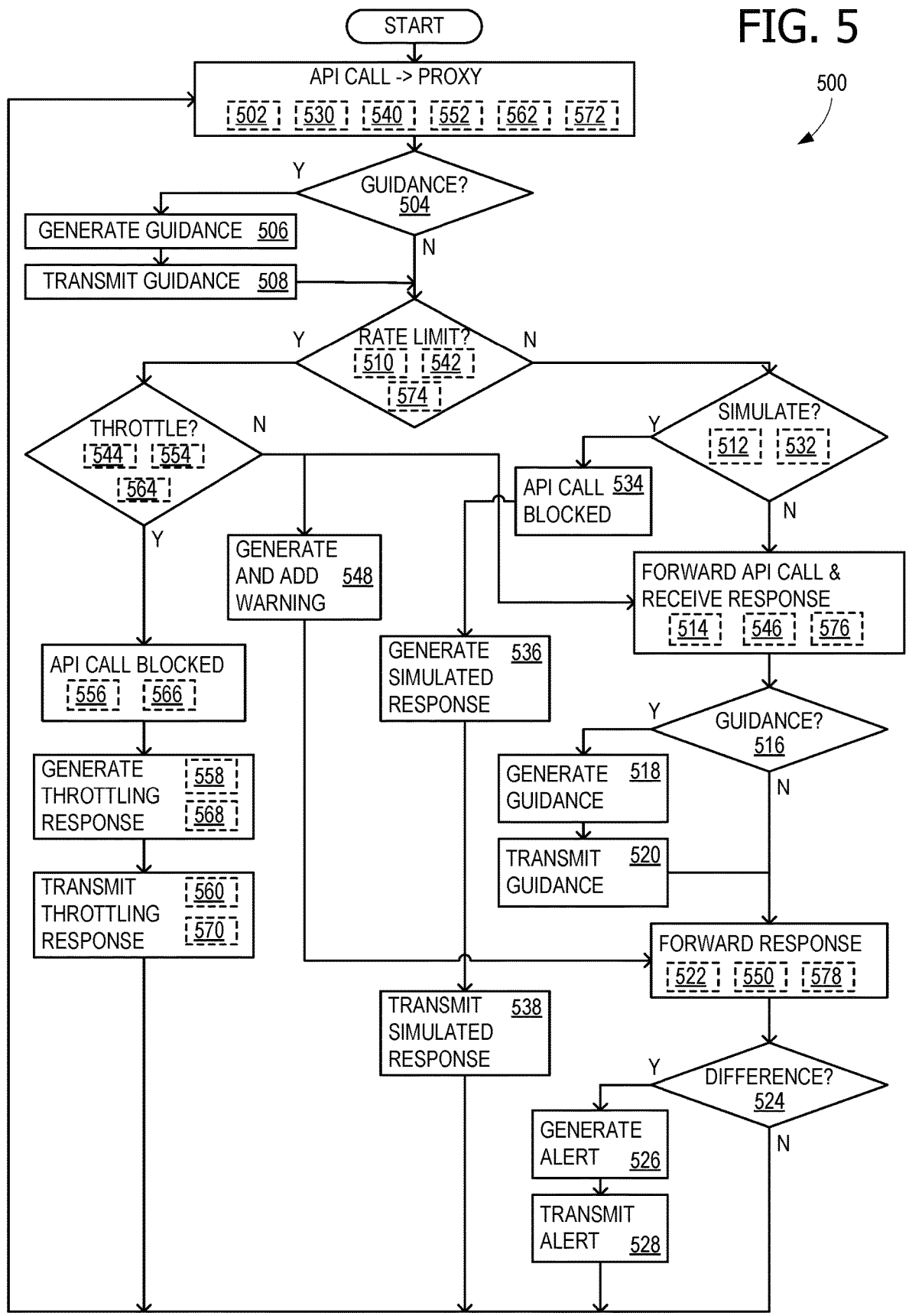

Application 106 begins executing for testing in operation 410, and API proxy 110 performs the operations of flowchart 500, shown in FIG. 5. In some examples, API proxy 110 records API calls received from application 106 (as recorded API calls 136) in operation 412, and records responses received from API endpoint 154 (as recorded responses 13) in operation 414. In operation 416, recorded API calls 136 and recorded responses 138 are compiled into API simulator 130 to enhance the API simulation of API proxy 110. In some examples, recorded responses 138 are passed through a separate configuration file. This allows developers to define custom recorded responses for their own APIs that are unknown when initially creating API proxy 110. Developers may load one or more recorded response configuration files with recorded responses into API simulator 130 so that API simulator 130 is able to use the responses while API proxy 110 is executing. Flowchart 400 then either finishes or returns to operation 402 for another test.

FIG. 5 shows a flowchart 500 illustrating exemplary operations that may be performed by architecture 100. In some examples, operations described for flowchart 500 are performed by computing device 900 of FIG. 9. FIGS. 6 and 7 show message sequence diagrams 600 and 700 of messages that may occur when using architecture 100 with flowchart 500. Flowchart 500 and message sequence diagram 600 are described together first, including the use of guidance messages (request and response), the operation of API simulator 130, and determining difference 124. Flowchart 500 and message sequence diagram 700 are described together next, including rate limiting and throttling operations.

Some of the blocks in flowchart 500 have multiple sub-blocks (shown with dashed lines), to facilitate the description of flowchart 500 in relation to the different messages shown in message sequence diagrams 600 and 700. The functionality of the different sub-blocks is invoked for different API calls (e.g., 300a-300f) for which different messages are generated. FIGS. 5A, 5B, 5C, 5D, 5E, and 5F show specific subsets of the operations of flowchart 500, denoted flowcharts 500a, 500b, 500c, 500d, 500e, and 500f, respectively.

Figure 5A:
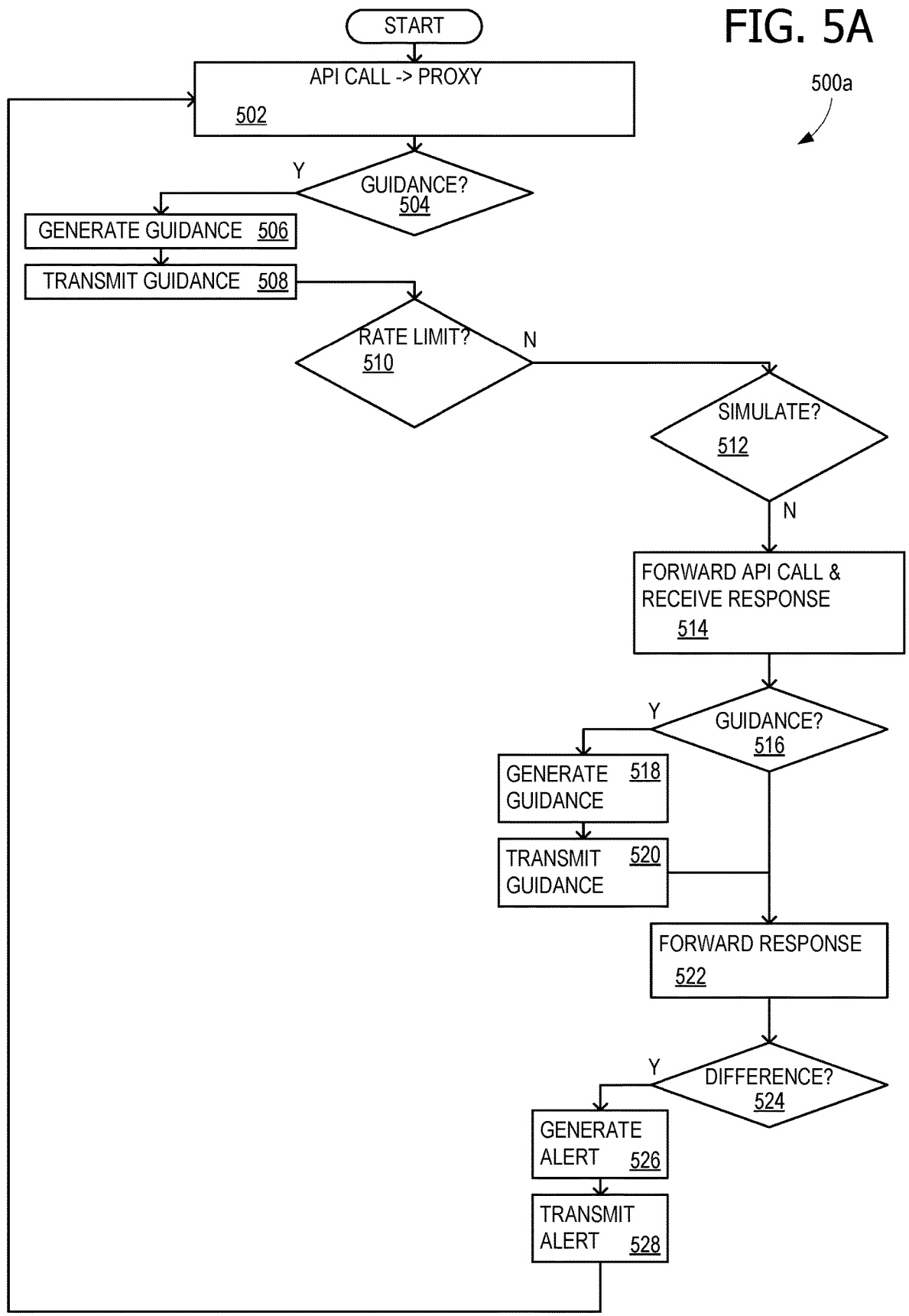
Figure 5B:
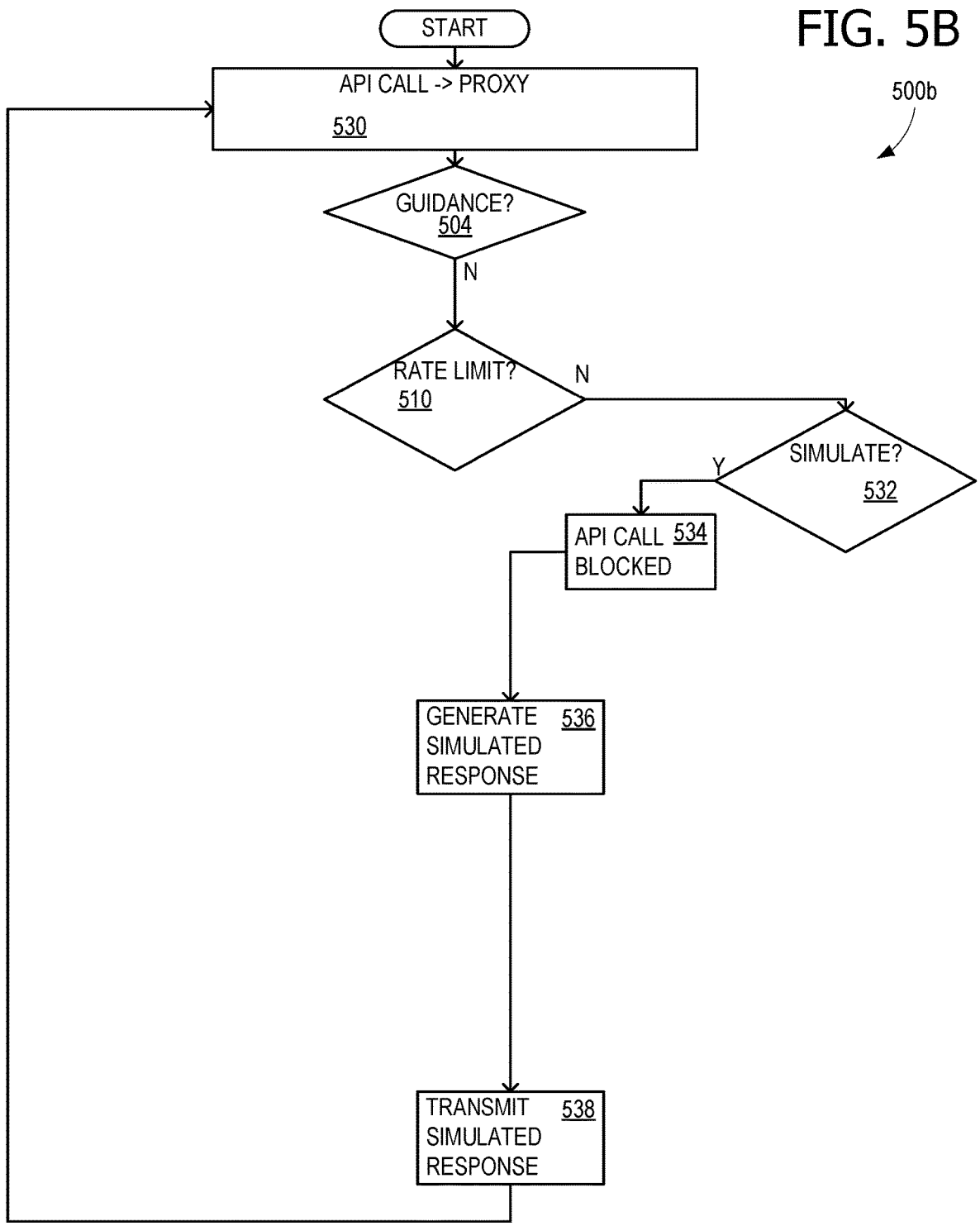
Figure 5C:
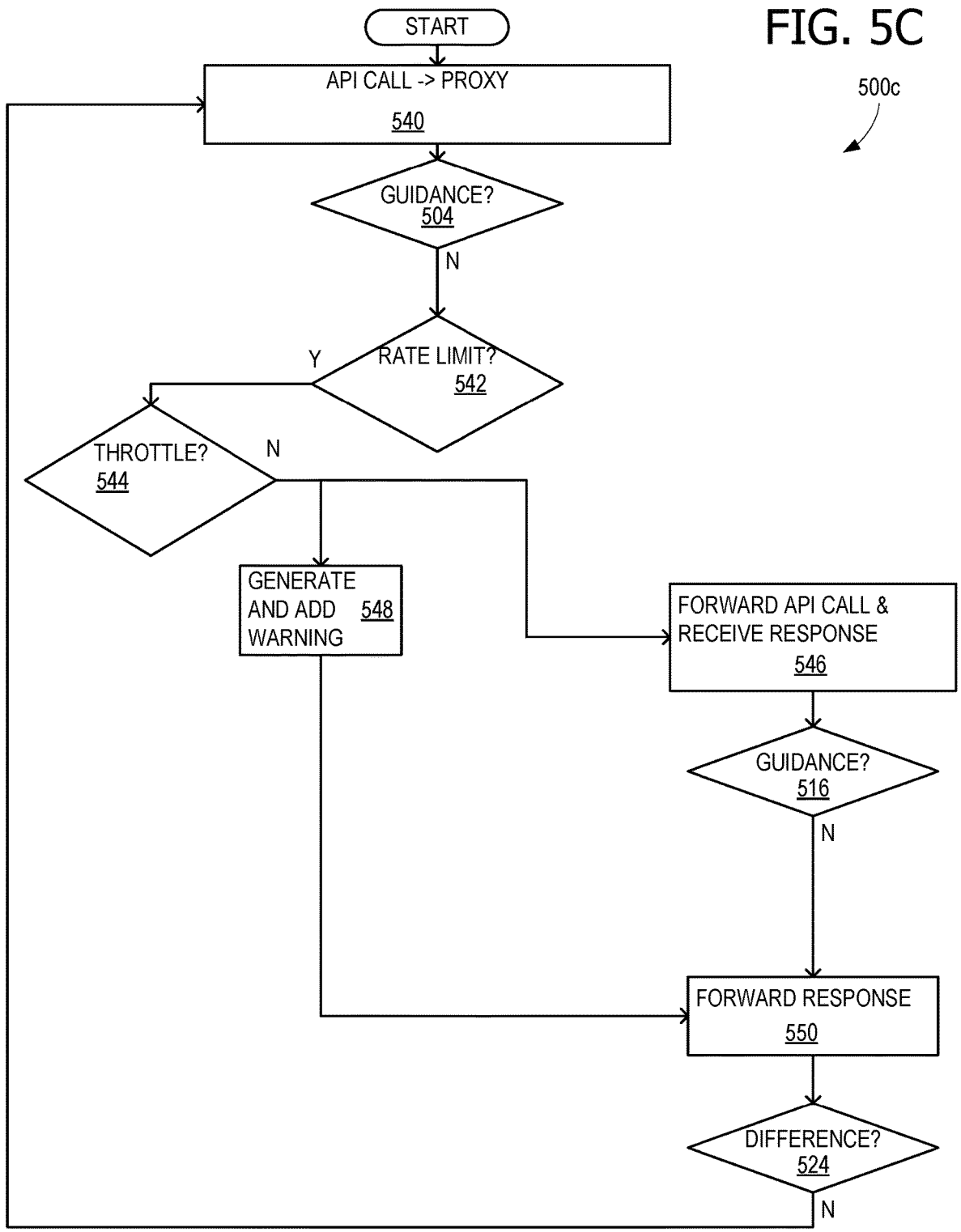
Figure 5D:
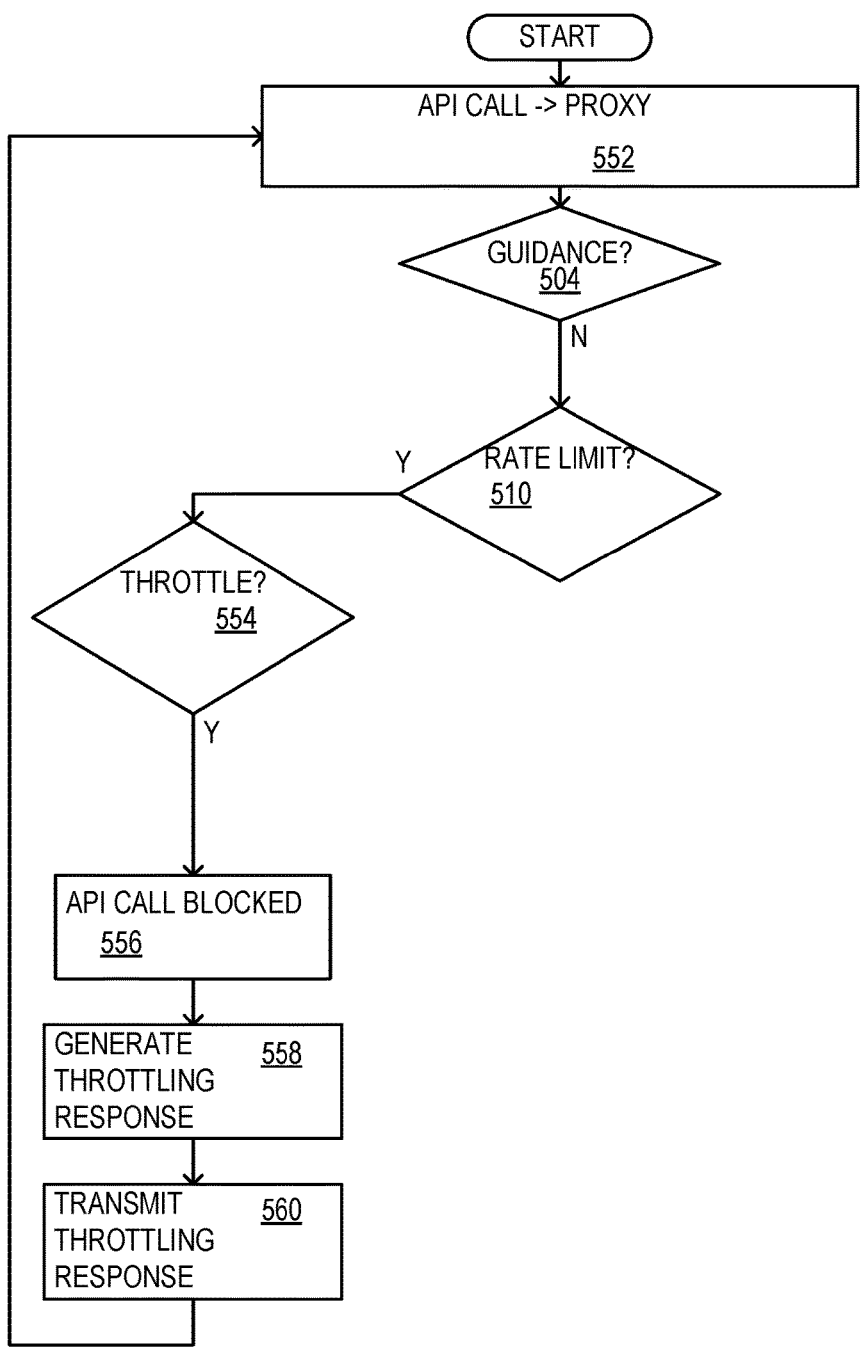
Figure 5E:
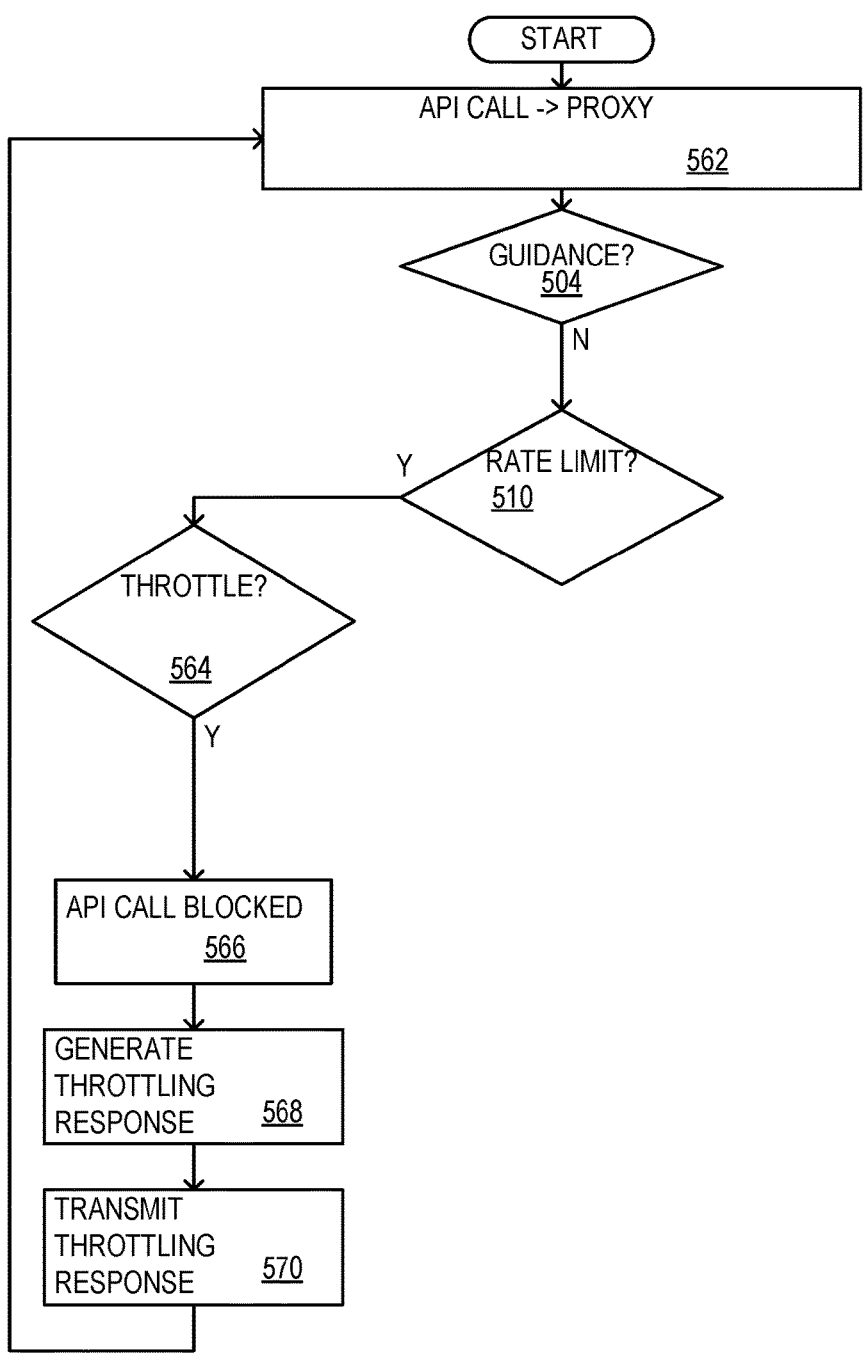

In the first pass through flowchart 500, the visited boxes are reproduced in flowchart 500a of FIG. 5A, with unvisited boxes being absent from flowchart 500a. Flowchart 500 commences with application 106 transmitting API call 300a and API proxy 110 receiving API call 300a, in operation 502. This is also shown in FIG. 6. The API calls 300a-300d of flowchart 500 are all examples of API call 300 of FIG. 3, and all are directed to API endpoint 154, and so contain the URI corresponding to API endpoint 154. As flowchart 500 returns to this first operation 502, in subsequent passes, it will be identified in turn as operation 530, 540, 552, 562, and 572 to avoid confusion with activity that occurs during other passes through flowchart 500.

Decision operation 504 determines whether API proxy 110 provides request guidance message 320 to development environment 104, based on at least receiving each API call (e.g., API call 300a). In some examples, this determination is performed by API call evaluator 112 assessing API call 300a against API call best practices 114. In this first pass, the positive determination (yes) is described. In operation 506, API proxy 110 generates request guidance message 320 (also shown in FIG. 6). Request guidance message 320 may include an instruction to reduce a privilege level, an instruction to reduce a computational burden, or some other improvement suggestion. API proxy 110 transmits request guidance message 320 to development environment 104 (e.g., UI 200) in operation 508.

In decision operation 510, API proxy 110 determines whether any rate limiting or throttling warning or action is merited. This decision operation is described in further detail below, in relation to message sequence diagram 700, when identified as decision operation 542 and 574. In this first pass through flowchart 500, the negative determination (no) is described. In decision operation 512, API proxy 110 determines whether to simulate a response to, or else forward, the API call (which in this pass, is API call 300a). The negative determination (no) is described first. As shown in FIG. 6, API proxy 110 forwards API call 300a to API endpoint 154 and receives response 310a, in operation 514.

In decision operation 516, based on at least receiving a response to an API call forwarded to API endpoint 154 (e.g., response 310a to API call 300a), API proxy 110 determines whether to provide response guidance message 330 to development environment 104. In this first pass through flowchart 500, the positive determination (yes) is described. API proxy 110 generates response guidance message 330 to development environment 104 in operation 518, which is also shown in FIG. 6. API proxy 110 then transmits response guidance message 330 to development environment 104 in operation 520.

API proxy 110 forwards response 310a to application 106 in operation 522, and in decision operation 524, API proxy 110 determines difference 124 between API specification 160 for API endpoint 154 (i.e., for API 152) and response 310a received from API endpoint 154. In this case, there is a difference and API proxy 110 generates alert 340 based on at least difference 124 in operation 526. This is also shown in FIG. 6. API proxy 110 transmits alert 340 to development environment 104 and/or API endpoint 154 in operation 528.

Returning to the top of flowchart 500, for clarity of presentation, operation 502 is now identified as operation 530, and a different pathway through flowchart 500 is now described. In this pass through flowchart 500, the visited boxes are reproduced in flowchart 500b of FIG. 5B, with unvisited boxes being absent from flowchart 500b. Application 106 transmits API call 300b and API proxy 110 receives API call 300b in operation 530. Passing through decision operations 504 and 510, decision operation 512 is revisited, but this time identified as decision operation 532. API proxy 110 determines whether to simulate a response or forward the API call (e.g., based on at least API simulation instructions 132).

In this pass through flowchart 500, the positive determination (yes) is described for decision operation 532, for example because (as identified in API simulation instructions 132) API call 300b is the specified $N^{th}$ API call for which to simulate a response. In operation 534, based on at least API simulation instructions 132, API proxy 110 does not forward API call 300b to API endpoint 154. API proxy 110 generates one or more simulated API responses 315 in operation 536, which is also shown in FIG. 6. In some examples, API proxy 110 uses simulated resources 144 for simulated API response 315. In some examples, API proxy 110 simulates API gateway policies. In operation 538, API proxy 110 transmits simulated API response 315 to application 106 in accordance with API simulation instructions 132.

Turning now to message sequence diagram 700, flowchart 500 and message sequence diagram 700 are described together. Returning to the top of flowchart 500, for clarity of presentation, operation 502 is now identified as operation 540, in which application 106 transmits API call 300c and API proxy 110 receives API call 300c. In this pass through flowchart 500, the visited boxes are reproduced in flowchart 500c of FIG. 5C, with unvisited boxes being absent from flowchart 500c. Passing through decision operation 504, decision operation 510 is revisited, but this time identified as decision operation 542. API proxy 110 determines whether any rate limiting or throttling warning or action is merited. In this pass through flowchart 500, the positive determination (yes) is described for decision operation 542. Resource limiting parameter 120 permits API proxy 110 to forward API call 300c to API endpoint 154, because API call 300c is not too soon after a prior API call, or does not present too much of a computational burden. However, if the computational burden is fairly high, a warning may be warranted. This provides a reason for the positive (yes) determination.

In decision operation 544, API proxy 110 determines whether to generate a warning or throttle and block the current API call 300c. In this pass, only a warning is provided, so the negative determination (no) is described. Flowchart 500 moves to operation 546 (previously visited as operation 514), in which API proxy 110 forwards API call 300c to API endpoint 154, based on at least resource limiting parameter 120, and receives response 310c. In parallel, API proxy 110 generates and adds simulated rate limiting response 350 to response 310c in operation 548. This is also shown in FIG. 7. These parallel branches merge in operation 550 (previously visited as operation 522), in which API proxy 110 forwards (transmits) response 310c to application 106 with or without an alert if there is a difference as determined in decision operation 524.

Returning to the top of flowchart 500, for clarity of presentation, operation 502 is now identified as operation 552. In this pass through flowchart 500, the visited boxes are reproduced in flowchart 500d of FIG. 5D, with unvisited boxes being absent from flowchart 500d. Application 106 transmits API call 300d and API proxy 110 receives API call 300d. Passing through decision operations 504 and 510 (or 542), decision operation 544 is revisited, but this time identified as decision operation 554. API proxy 110 determines whether API call 300d complies with simulated rate limiting response 350. In the illustrated scenario, API proxy 110 determines that the timing of API call 300d is earlier than identified in simulated rate limiting response 350 or the computational burden of API call 300d exceeds the computational burden identified in simulated rate limiting response 350. Flowchart 500 now takes the positive determination (yes) branch of decision operation 554.

As shown in operation 556, API proxy 110 does not forward API call 300d to API endpoint 154, based on at least resource limiting parameter 120 and timing or computational burden of API call 300d. In operation 558, which is also shown in FIG. 7, API proxy 110 generates simulated throttling response 360a, which may comprise API call timing limitation 116, such as a delay instruction. API proxy 110 transmits simulated throttling response 360a to application 106 in operation 560.

Returning to the top of flowchart 500, for clarity of presentation, operation 502 is now identified as operation 562, in which application 106 transmits API call 300e and API proxy 110 receives API call 300e. In this pass through flowchart 500, the visited boxes are reproduced in flowchart 500e of FIG. 5E, with unvisited boxes being absent from flowchart 500e. Passing through decision operations 504 and 510 (or 542), decision operation 544 (or 554) is revisited, but this time identified as decision operation 564. API proxy 110 determines whether API call 300e complies with simulated throttling response 360a. In the illustrated scenario, API proxy 110 determines that the timing of API call 300e is earlier than identified in simulated throttling response 360a, and so flowchart 500 takes the positive determination (e.g., yes) branch of decision operation 564.

As shown in operation 566 (previously visited as operation 556), API proxy 110 does not forward API call 300e to API endpoint 154, based on at least the timing of API call 300e. In operation 568 (previously visited as operation 558), which is also shown in FIG. 7, API proxy 110 generates simulated throttling response 360b, which may comprise API call timing limitation 116, such as a delay instruction. API proxy 110 transmits simulated throttling response 360b to application 106 in operation 570 (previously visited as operation 560).

Returning to the top of flowchart 500, for clarity of presentation, operation 502 is now identified as operation 572, in which application 106 transmits API call 300f and API proxy 110 receives API call 300f. In this pass through flowchart 500, the visited boxes are reproduced in flowchart 500f of FIG. 5F, with unvisited boxes being absent from flowchart 500f. Passing through decision operation 504, decision operation 510 (or 542) is revisited, but this time identified as decision operation 574. API proxy 110 determines whether API call 300f complies with simulated throttling response 360a. In the illustrated scenario, API proxy 110 determines that the timing of API call 300f does comply with simulated throttling response 360a, and so flowchart 500 takes the negative determination (e.g., no) branch of decision operation 574.

In operation 576 (previously visited as operation 514, 546), API proxy 110 forwards API call 300f to API endpoint 154, and receives response 310f, based on at least determining that API call 300f does comply with simulated throttling response 360a. In operation 578 (previously visited as operation 522, 550), API proxy 110 forwards (transmits) response 310f to application 106 with or without an alert if there is a difference as determined in decision operation 524.

Figure 8:
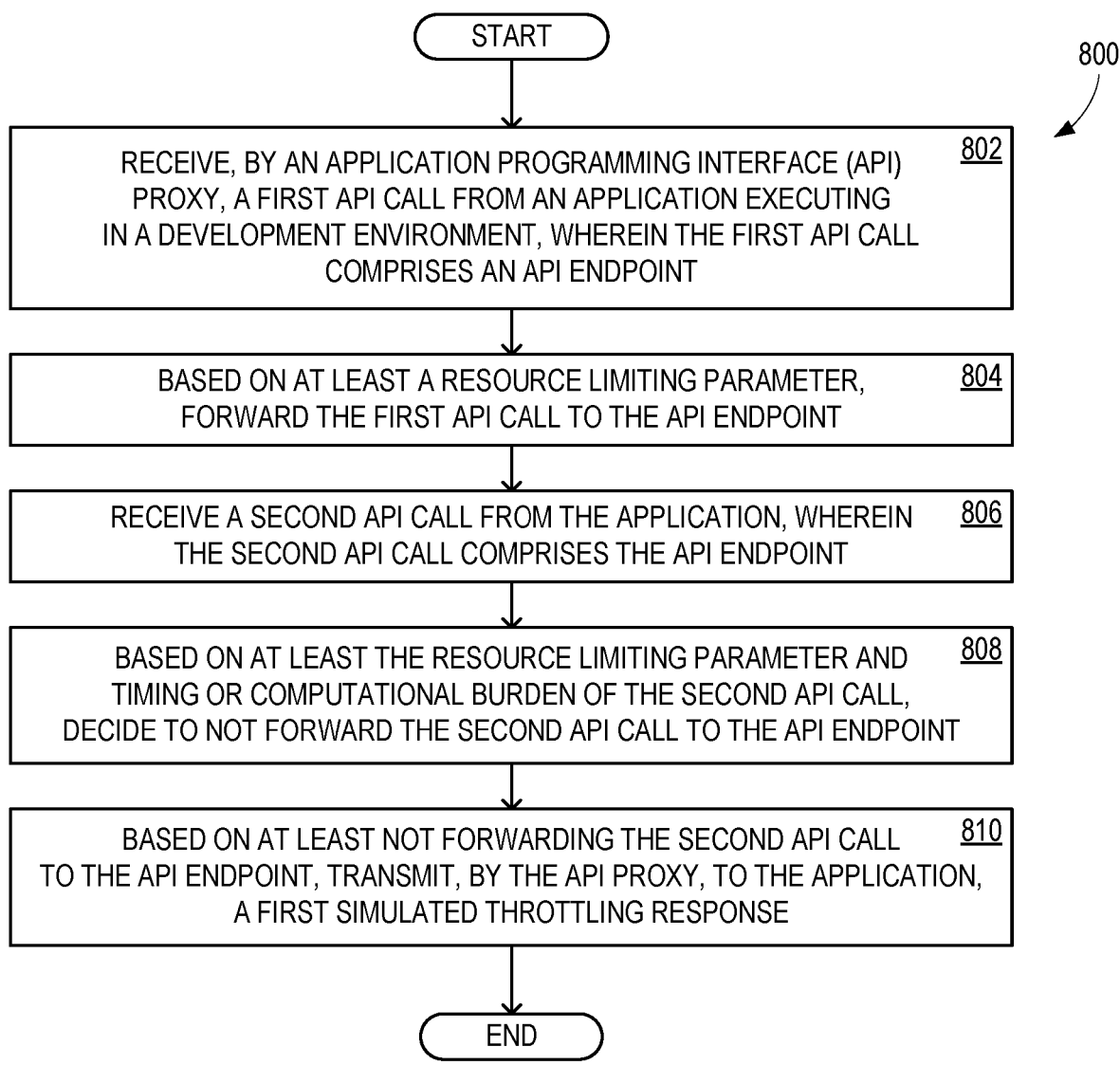
FIG. 8 shows another flowchart illustrating exemplary operations that may be performed when using example architectures, such as that of FIG. 1.

FIG. 8 shows a flowchart 800 illustrating exemplary operations that may be performed by architecture 100. In some examples, operations described for flowchart 800 are performed by computing device 900 of FIG. 9. Flowchart 800 commences with operation 802, which includes receiving, by an API proxy, a first API call from an application executing in a development environment, wherein the first API call comprises an API endpoint. Operation 804 includes, based on at least a resource limiting parameter, forwarding the first API call to the API endpoint.

Operation 806 includes receiving a second API call from the application, wherein the second API call comprises the API endpoint. Operation 808 includes, based on at least the resource limiting parameter and timing or computational burden of the second API call, determining to not forward the second API call to the API endpoint. Operation 810 includes, based on at least not forwarding the second API call to the API endpoint, transmitting, by the API proxy, to the application, a first simulated throttling response.

Additional Examples

An example system comprises: a processor; and a computer-readable medium storing instructions that are operative upon execution by the processor to: receive, by an API proxy, a first API call from an application executing in a development environment, wherein the first API call comprises an API endpoint: based on at least a resource limiting parameter, forward the first API call to the API endpoint: receive a second API call from the application, wherein the second API call comprises the API endpoint: based on at least (i) the resource limiting parameter and (ii) timing or computational burden of the second API call, determine to not forward the second API call to the API endpoint; and based on at least not forwarding the second API call to the API endpoint, transmit, by the API proxy, to the application, a first simulated throttling response.

An example computer-implemented method comprises: receiving, by an API proxy, a first API call from an application executing in a development environment, wherein the first API call comprises an API endpoint; based on at least a resource limiting parameter, forwarding the first API call to the API endpoint: receiving a second API call from the application, wherein the second API call comprises the API endpoint: based on at least (i) the resource limiting parameter and (ii) timing or computational burden of the second API call, determining to not forward the second API call to the API endpoint; and based on at least not forwarding the second API call to the API endpoint, transmitting, by the API proxy, to the application, a first simulated throttling response.

One or more example computer storage devices have computer-executable instructions stored thereon, which, on execution by a computer, cause the computer to perform operations comprising: receiving, by an API proxy, a first API call from an application executing in a development environment, wherein the first API call comprises an API endpoint; based on at least a resource limiting parameter, forwarding the first API call to the API endpoint: receiving a second API call from the application, wherein the second API call comprises the API endpoint: based on at least (i) the resource limiting parameter and (ii) timing or computational burden of the second API call, determining to not forward the second API call to the API endpoint; and based on at least not forwarding the second API call to the API endpoint, transmitting, by the API proxy, to the application, a first simulated throttling response.

Alternatively, or in addition to the other examples described herein, examples include any combination of the following:
  receiving a third API call from the application, wherein the third API call comprises the API endpoint;
  determining whether the third API call complies with the first simulated throttling response;
  based on at least determining that the third API call does comply with the first simulated throttling response, forwarding the third API call to the API endpoint;
  based on at least determining that the third API call does not comply with the first simulated throttling response, not forwarding the third API call to the API endpoint;
  based on at least determining that the third API call does not comply with the first simulated throttling response, transmitting, by the API proxy, to the application, a second simulated throttling response;
  based on at least receiving the first API call from the application, transmitting, by the API proxy, to the application, a simulated rate limiting response;
  the timing of the second API call is earlier than identified in the simulated rate limiting response or the computational burden of the second API call exceeds a computational burden limitation identified in the simulated rate limiting response;
  based on at least receiving each API call, determining whether to provide a request guidance message;
  based on at least receiving each API call, and based on at least determining to provide the request guidance message, transmitting, by the API proxy, to the development environment, the request guidance message;
  based on at least receiving a response to an API call forwarded to the API endpoint, forwarding the response to the application;
  based on at least receiving a response to an API call forwarded to the API endpoint, determining whether to provide a response guidance message;
  based on at least receiving a response to an API call forwarded to the API endpoint and based on at least determining to provide the response guidance message, transmitting, by the API proxy, to the development environment, the response guidance message;
  receiving, by the API proxy, from the development environment, API simulation instructions;
  receiving a fourth API call from the application, wherein the fourth API call comprises the API endpoint;
  based on at least the API simulation instructions, not forwarding the fourth API call to the API endpoint;
  based on at least the API simulation instructions, transmitting, by the API proxy, to the application, a simulated API response in accordance with the API simulation instructions;
  generating simulated resources;
  generating, by the API proxy, simulated API responses using the simulated resources;
  an ML model determines whether to provide a request guidance message;
  an ML model generates a request guidance message;
  an ML model determines whether to provide a response guidance message;
  an ML model generates a response guidance message;
  an ML model generates the simulated resources;
  the API endpoint comprises a URI;
  the URI comprises a URL;

the first API call further comprises an API method;

the first API call further comprises a query parameter and/or a header;

the development environment activates the API proxy;

the API proxy and the development environment are hosted by a common computing node;

the API proxy registers with a network stack of the computing node;

the first simulated throttling response comprises an API call timing limitation;

the API call timing limitation comprises a delay instruction;

the resource limiting parameter comprises an API call timing limitation;

the resource limiting parameter comprises a computational burden limitation;

determining whether to provide the request guidance message comprises assessing the API call against API call best practices;

the request guidance message comprises an instruction to reduce a privilege level;

the request guidance message comprises an instruction to reduce a computational burden;

not forwarding the fourth API call to the API endpoint based on at least prior-existing API simulation instructions;

receiving, by the API proxy, from the development environment, the resource limiting parameter;

recording API calls received from the application;

recording responses, to API calls, received from the API endpoint;

compiling the recorded API calls and the recorded responses into an API simulator for the API proxy;

simulating, by the API proxy, API gateway policies;

determining a difference between an API specification for the API endpoint and a response received from the API endpoint; and based on at least the difference between the API specification and the responses received from the API endpoint, generating an alert.

While the aspects of the disclosure have been described in terms of various examples with their associated operations, a person skilled in the art would appreciate that a combination of operations from any number of different examples is also within scope of the aspects of the disclosure.

Example Operating Environment

Figure 9:
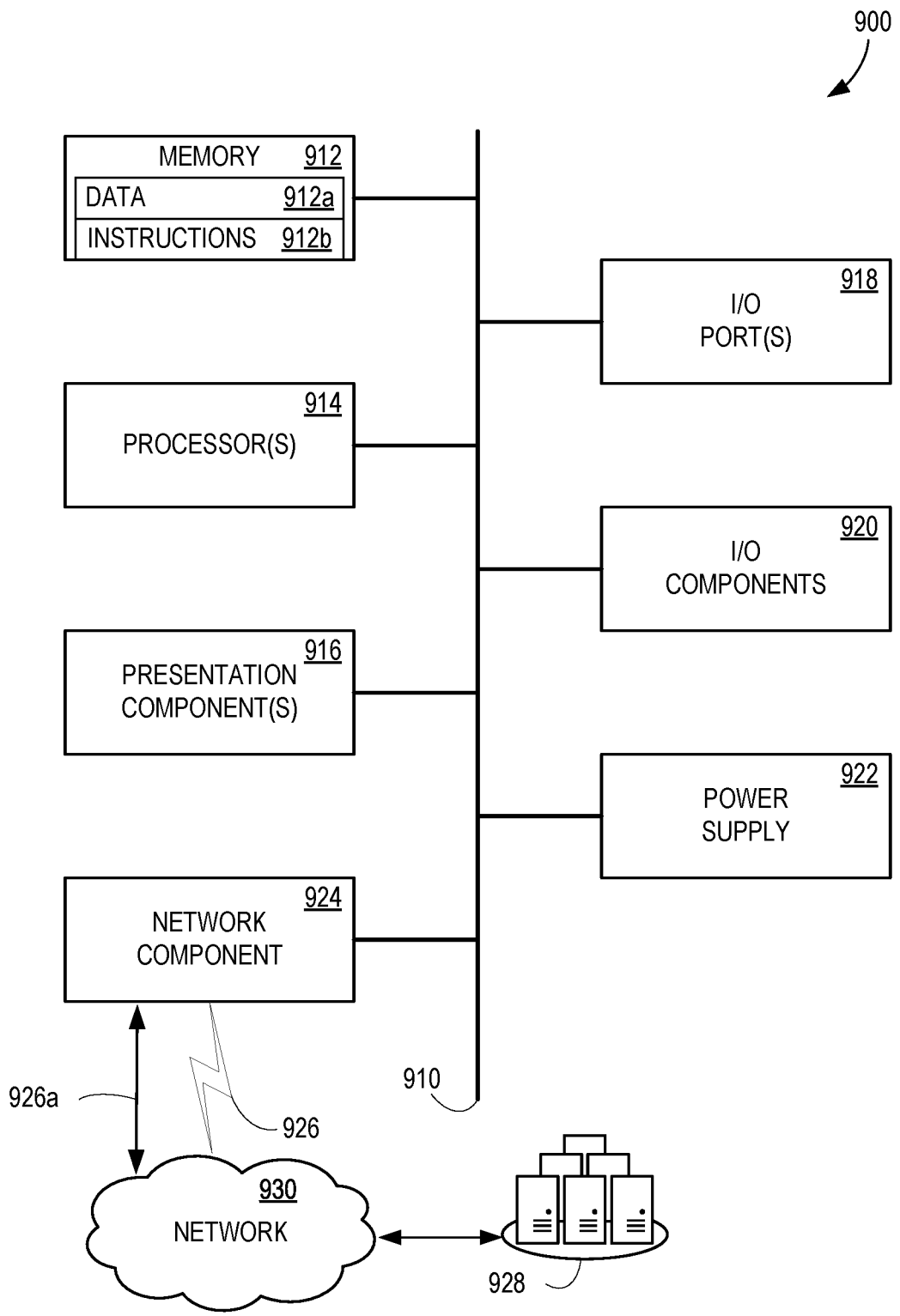
FIG. 9 shows a block diagram of an example computing device suitable for implementing some of the various examples disclosed herein.

FIG. 9 is a block diagram of an example computing device 900 (e.g., a computer storage device) for implementing aspects disclosed herein, and is designated generally as computing device 900. In some examples, one or more computing devices 900 are provided for an on-premises computing solution. In some examples, one or more computing devices 900 are provided as a cloud computing solution. In some examples, a combination of on-premises and cloud computing solutions are used. Computing device 900 is but one example of a suitable computing environment and is not intended to suggest any limitation as to the scope of use or functionality of the examples disclosed herein, whether used singly or as part of a larger set.

Neither should computing device 900 be interpreted as having any dependency or requirement relating to any one or combination of components/modules illustrated. The examples disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples may be practiced in a variety of system configurations, including personal computers, laptops, smart phones, mobile tablets, hand-held devices, consumer electronics, specialty computing devices, etc. The disclosed examples may also be practiced in distributed computing environments when tasks are performed by remote-processing devices that are linked through a communications network.

Computing device 900 includes a bus 910 that directly or indirectly couples the following devices: computer storage memory 912, one or more processors 914, one or more presentation components 916, input/output (I/O) ports 918, I/O components 920, a power supply 922, and a network component 924. While computing device 900 is depicted as a seemingly single device, multiple computing devices 900 may work together and share the depicted device resources. For example, memory 912 may be distributed across multiple devices, and processor(s) 914 may be housed with different devices.

Bus 910 represents what may be one or more buses (such as an address bus, data bus, or a combination thereof). Although the various blocks of FIG. 9 are shown with lines for the sake of clarity, delineating various components may be accomplished with alternative representations. For example, a presentation component such as a display device is an I/O component in some examples, and some examples of processors have their own memory. Distinction is not made between such categories as "workstation," "server," "laptop," "hand-held device," etc., as all are contemplated within the scope of FIG. 9 and the references herein to a "computing device." Memory 912 may take the form of the computer storage media referenced below and operatively provide storage of computer-readable instructions, data structures, program modules and other data for the computing device 900. In some examples, memory 912 stores one or more of an operating system, a universal application platform, or other program modules and program data. Memory 912 is thus able to store and access data 912a and instructions 912b that are executable by processor 914 and configured to carry out the various operations disclosed herein. Thus, computing device 900 comprises a computer storage device having computer-executable instructions 912b stored thereon.

In some examples, memory 912 includes computer storage media. Memory 912 may include any quantity of memory associated with or accessible by the computing device 900. Memory 912 may be internal to the computing device 900 (as shown in FIG. 9), external to the computing device 900 (not shown), or both (not shown). Additionally, or alternatively, the memory 912 may be distributed across multiple computing devices 900, for example, in a virtualized environment in which instruction processing is carried out on multiple computing devices 900. For the purposes of this disclosure, "computer storage media," "computer storage memory," "memory," and "memory devices" are synonymous terms for the memory 912, and none of these terms include carrier waves or propagating signaling.

Processor(s) 914 may include any quantity of processing units that read data from various entities, such as memory 912 or I/O components 920. Specifically, processor(s) 914 are programmed to execute computer-executable instructions for implementing aspects of the disclosure. The instructions may be performed by the processor, by multiple processors within the computing device 900, or by a processor external to the client computing device 900. In some examples, the processor(s) 914 are programmed to execute instructions such as those illustrated in the flow charts discussed below and depicted in the accompanying drawings. Moreover, in some examples, the processor(s) 914 represents an implementation of analog techniques to perform the operations described herein. For example, the operations may be performed by an analog client computing device 900 and/or a digital client computing device 900. Presentation component(s) 916 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 900, across a wired connection, or in other ways. I/O ports 918 allow computing device 900 to be logically coupled to other devices including I/O components 920, some of which may be built in. Example I/O components 920 include, for example but without limitation, a microphone, joystick, game pad, satellite dish, scanner, printer, wireless device, etc.

Computing device 900 may operate in a networked environment via the network component 924 using logical connections to one or more remote computers. In some examples, the network component 924 includes a network interface card and/or computer-executable instructions (e.g., a driver) for operating the network interface card. Communication between the computing device 900 and other devices may occur using any protocol or mechanism over any wired or wireless connection. In some examples, network component 924 is operable to communicate data over public, private, or hybrid (public and private) using a transfer protocol, between devices wirelessly using short range communication technologies (e.g., near-field communication (NFC), Bluetooth™ branded communications, or the like), or a combination thereof. Network component 924 communicates over wireless communication link 926 and/or a wired communication link 926a to a remote resource 928 (e.g., remote server 150 or a cloud resource) across network 930. Various different examples of communication links 926 and 926a include a wireless connection, a wired connection, and/or a dedicated link, and in some examples, at least a portion is routed through the internet.

Although described in connection with an example computing device 900, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, augmented reality (AR) devices, mixed reality devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions, or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media do not include signals. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that may be used to store information for access by a computing device. In contrast, communication media typically embody computer readable instructions, data structures, program modules, or the like in a modulated data signal such as a carrier wave or other transport mechanism and include any information delivery media.

The order of execution or performance of the operations in examples of the disclosure illustrated and described herein is not essential, and may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system comprising:
a processor; and
a computer-readable medium storing instructions that are operative upon execution by the processor to:
receive, by an application programming interface (API) proxy, a first API call from an application executing in a development environment, wherein the first API call comprises an API endpoint;
based on at least a resource limiting parameter, forward the first API call to the API endpoint;
receive a second API call from the application, wherein the second API call comprises the API endpoint;
based on at least (i) the resource limiting parameter and (ii) timing or computational burden of the second API call, determine to not forward the second API call to the API endpoint; and
based on at least not forwarding the second API call to the API endpoint, transmit, by the API proxy to the application, a first simulated throttling response.

2. The system of claim 1, wherein the instructions are further operative to:
receive a third API call from the application, wherein the third API call comprises the API endpoint;
determine that the third API call complies with the first simulated throttling response;
based on at least determining that the third API call does comply with the first simulated throttling response, forward the third API call to the API endpoint; and
based on at least determining that the third API call does not comply with the first simulated throttling response:
determine to not forward the third API call to the API endpoint; and
transmit, by the API proxy, to the application, a second simulated throttling response.

3. The system of claim 1, wherein the instructions are further operative to:
based on at least receiving the first API call from the application, transmit, by the API proxy, to the application, a simulated rate limiting response, wherein the timing of the second API call is earlier than identified in the simulated rate limiting response or the computational burden of the second API call exceeds a computational burden limitation identified in the simulated rate limiting response.

4. The system of claim 1, wherein the instructions are further operative to:
based on at least receiving each API call:
determine to provide a request guidance message; and
based on at least determining to provide the request guidance message, transmit, by the API proxy, to the development environment, the request guidance message.

5. The system of claim 1, wherein the instructions are further operative to:
based on at least receiving a response to an API call forwarded to the API endpoint:
forward the response to the application;
determine to provide a response guidance message; and
based on at least determining to provide the response guidance message, transmit, by the API proxy, to the development environment, the response guidance message.

6. The system of claim 1, wherein the instructions are further operative to:
receive, by the API proxy, from the development environment, API simulation instructions;
receive a fourth API call from the application, wherein the fourth API call comprises the API endpoint;
based on at least the API simulation instructions:
determine to not forward the fourth API call to the API endpoint; and
transmit, by the API proxy, to the application, a simulated API response in accordance with the API simulation instructions.

7. The system of claim 1, wherein the instructions are further operative to:
generate simulated resources; and
generate, by the API proxy, simulated API responses using the simulated resources.

8. A computer-implemented method comprising:
receiving, by an application programming interface (API) proxy, a first API call from an application executing in a development environment, wherein the first API call comprises an API endpoint, and wherein the API endpoint comprises a uniform resource identifier (URI);
based on at least a resource limiting parameter, forwarding the first API call to the API endpoint;
receiving a second API call from the application, wherein the second API call comprises the API endpoint;
based on at least (i) the resource limiting parameter and (ii) timing or computational burden of the second API call, determining to not forward the second API call to the API endpoint; and
based on at least not forwarding the second API call to the API endpoint, transmitting, by the API proxy, to the application, a first simulated throttling response.

9. The computer-implemented method of claim 8, further comprising:
receiving a third API call from the application, wherein the third API call comprises the API endpoint;
determining that the third API call complies with the first simulated throttling response;
based on at least determining that the third API call does comply with the first simulated throttling response, forwarding the third API call to the API endpoint; and
based on at least determining that the third API call does not comply with the first simulated throttling response:
determining to not forwarding the third API call to the API endpoint; and
transmitting, by the API proxy, to the application, a second simulated throttling response.

10. The computer-implemented method of claim 8, further comprising:
based on at least receiving the first API call from the application, transmitting, by the API proxy, to the application, a simulated rate limiting response, wherein the timing of the second API call is earlier than identified in the simulated rate limiting response or the computational burden of the second API call exceeds a computational burden limitation identified in the simulated rate limiting response.

11. The computer-implemented method of claim 8, further comprising:
based on at least receiving each API call:
determining to provide a request guidance message; and
based on at least determining to provide the request guidance message, transmitting, by the API proxy, to the development environment, the request guidance message.

12. The computer-implemented method of claim 8, further comprising:
based on at least receiving a response to an API call forwarded to the API endpoint:
forwarding the response to the application;
determining to provide a response guidance message; and
based on at least determining to provide the response guidance message, transmitting, by the API proxy, to the application, the response guidance message.

13. The computer-implemented method of claim 8, further comprising:
receiving, by the API proxy, from the development environment, API simulation instructions;
receiving a fourth API call from the application, wherein the fourth API call comprises the API endpoint;
based on at least the API simulation instructions:
determining to not forward the fourth API call to the API endpoint; and
transmitting, by the API proxy, to the application, a simulated API response in accordance with the API simulation instructions.

14. The computer-implemented method of claim 8, further comprising:
generating simulated resources; and
generating, by the API proxy, simulated API responses using the simulated resources.

15. A computer storage device having computer-executable instructions stored thereon, which, on execution by a computer, cause the computer to perform operations comprising:
receiving, by an application programming interface (API) proxy, a first API call from an application executing in a development environment, wherein the first API call comprises an API endpoint, and wherein the API proxy and the development environment are hosted by a common computing node;
based on at least a resource limiting parameter, forwarding the first API call to the API endpoint;
receiving a second API call from the application, wherein the second API call comprises the API endpoint;
based on at least (i) the resource limiting parameter and (ii) timing or computational burden of the second API call, determining to not forward the second API call to the API endpoint; and
based on at least not forwarding the second API call to the API endpoint, transmitting, by the API proxy, to the application, a first simulated throttling response.

16. The computer storage device of claim 15, wherein the operations further comprise:
receiving a third API call from the application, wherein the third API call comprises the API endpoint;
determining that the third API call complies with the first simulated throttling response:
based on at least determining that the third API call does comply with the first simulated throttling response, forwarding the third API call to the API endpoint; and
based on at least determining that the third API call does not comply with the first simulated throttling response:
determining to not forward the third API call to the API endpoint; and
transmitting, by the API proxy, to the application, a second simulated throttling response.

17. The computer storage device of claim 15, wherein the operations further comprise:
based on at least receiving the first API call from the application, transmitting, by the API proxy, to the application, a simulated rate limiting response, wherein the timing of the second API call is earlier than identified in the simulated rate limiting response or the computational burden of the second API call exceeds a computational burden limitation identified in the simulated rate limiting response.

18. The computer storage device of claim 15, wherein the operations further comprise:
based on at least receiving each API call:
determining to provide a request guidance message; and
based on at least determining to provide the request guidance message, transmitting, by the API proxy, to the development environment, the request guidance message.

19. The computer storage device of claim 15, wherein the operations further comprise:
based on at least receiving a response to an API call forwarded to the API endpoint:
forwarding the response to the application;
determining to provide a response guidance message; and
based on at least determining to provide the response guidance message, transmitting, by the API proxy, to the application, the response guidance message.

20. The computer storage device of claim 15, wherein the operations further comprise:
receiving, by the API proxy, from the development environment, API simulation instructions;
receiving a fourth API call from the application, wherein the fourth API call comprises the API endpoint;
based on at least the API simulation instructions:
determining to not forward the fourth API call to the API endpoint; and
transmitting, by the API proxy, to the application, a simulated API response in accordance with the API simulation instructions.

\* \* \* \* \*